(12) United States Patent
Park

(10) Patent No.: US 9,120,691 B2
(45) Date of Patent: Sep. 1, 2015

(54) ISOPIPE SAG CONTROL USING IMPROVED END SUPPORT CONDITIONS

(75) Inventor: Eunyoung Park, Elmira, NY (US)

(73) Assignee: CORNING INCORPORATED, Corning, NY (US)

(*) Notice: Subject to any disclaimer, the term of this patent is extended or adjusted under 35 U.S.C. 154(b) by 672 days.

(21) Appl. No.: 13/172,165

(22) Filed: Jun. 29, 2011

(65) Prior Publication Data

US 2011/0253226 A1 Oct. 20, 2011

Related U.S. Application Data

(62) Division of application No. 12/151,794, filed on May 9, 2008, now abandoned.

(60) Provisional application No. 60/928,726, filed on May 11, 2007.

(51) Int. Cl.
*C03B 17/00* (2006.01)
*C03B 17/06* (2006.01)

(52) U.S. Cl.
CPC ......... *C03B 17/064* (2013.01); *Y10T 137/0402* (2015.04)

(58) Field of Classification Search
USPC ......... 65/90, 258, 374.13; 248/123.11, 219.3, 248/229.12, 229.22, 316.5; 264/607, 608
See application file for complete search history.

(56) References Cited

U.S. PATENT DOCUMENTS

| 2,291,289 | A | * | 7/1942 | Slayter et al. | 65/510 |
| 5,603,193 | A | * | 2/1997 | Koertge et al. | 52/506.07 |
| 2003/0192349 | A1 | | 10/2003 | Meda et al. | |
| 2005/0183455 | A1 | * | 8/2005 | Pitbladdo | 65/29.11 |

FOREIGN PATENT DOCUMENTS

JP        47-1940        1/1972

OTHER PUBLICATIONS

JP 2010-508362 Office Action.

* cited by examiner

*Primary Examiner* — Erin Snelting
(74) *Attorney, Agent, or Firm* — Kevin M. Able; Walter M. Douglas; Thomas R. Beall

(57) ABSTRACT

The invention is directed to a method of preventing isopipe sag when using the overflow drawdown fusion process for making flat glass sheets. The method applies a vertical restraint on at least one end of an isopipe resting on a support to thereby reduce sage and/or the rate of sag during use of the isopipe. Using the vertical restraint block in accordance with the invention, the sag and/or rate of sag has been found to be reduced by at least 40 percent relative to an isopipe that does not use the vertical restraints of the invention or a compressive force along the sides of the isopipe.

6 Claims, 4 Drawing Sheets

ISOPIPE SAG CONTROL USING IMPROVED END SUPPORT CONDITIONS

CROSS-REFERENCE TO RELATED APPLICATIONS

This application is a divisional of U.S. patent application Ser. No. 12/151,794 filed on May 9, 2008 now abandoned, which claims the benefit of priority under 35 U.S.C. 119 of U.S. Provisional Application Ser. No. 60/928,726, filed on May 11, 2007, the contents of which are relied upon and incorporated herein by reference in their entireties.

FIELD

The invention is directed the isopipes that are used in the production of sheet glass by the fusion process, and in particular to the techniques that are used for controlling the sag which such pipes exhibit during use.

BACKGROUND

The fusion process is one of the basic techniques used in the glass making art to produce sheet glass. (See A. K. Varshneya, "Flat Glass", Fundamentals of Inorganic Glasses (Academic Press Inc., Boston 1994), Chapter 20, section 4.2, pages 534-540.) Compared to other processes known in the art, for example, the float and slot-draw processes, the fusion process produces glass sheets whose surfaces have superior flatness and smoothness. As a result, the fusion process has become highly important for the production of glass substrates that are used in the manufacture of liquid crystal displays (LCDs) and other substrates that require superior flatness and smoothness. The fusion process, and particularly the overflow downdraw fusion process, is discussed in commonly assigned U.S. Pat. Nos. 3,338,696 and 3,682,609 to Stuart Dockerty, and U.S. Pat. No. 3,437,470 to Overman, the teaching of which are incorporated herein by reference.

In the fusion process, the molten glass is fed into an isopipe and evenly flows over both sides to form a sheet of flat glass with pristine surfaces. The isopipe is designed to deliver the molten glass at a uniform flow rate, and the use of the isopipe and uniform flow rate are critical for the production of glass with uniform thickness. Due to high operating temperature and the gravitational load caused by isopipe itself and the molten glass, the isopipe sags over time with creep behavior. This causes the flow rate to change along the isopipe and affects the final glass quality. Methods of "sag control" have been described in commonly assigned US. Patent Application Publication Nos. 2003/0192349 A1 and 2004/0055338 A1; and also in Japanese Patent Application Publication Nos. 2004-315286 and 2004-315287. At the present time horizontal compression force is used to reduce the sag as is illustrated in FIGS. 1 and 2 from US. Patent Application Publication No. 2003/0192349 A1. However, as the isopipe becomes longer, higher compression forces are required and the implementation of such higher compression forces presents a challenging design procedure. In particular, as the size of the glass substrate being made using the fusion process and isopipe increases, the need for reducing isopipe sag to zero, or as near-zero as possible, becomes ever more important in order to maintain product quality and reduce costs.

Current isopipes behave like a simply-supported beam (see FIGS. 1 and 2). That is, both ends of the isopipe sit on pier blocks which prevent their vertical translation (FIG. 1). This type of the boundary condition allows the ends of the pipe to rotate and it results in non-zero slope at both ends. One method currently in use to correct the slope such that it remains zero, or as near-zero as possible, is to apply a compression force at the ends of the isopipe (see FIG. 2) to produce the counter-bending moment which can partly cancel out the bending-moment caused by the isopipe and the weight of the glass (that is, pipe "sag"). However, there are two disadvantages to this compression force remedy; namely:

the force is quite inefficient in creating a large amount of the bending moment since moment arm is very short; and due to this inefficiency, substantial amount of force is required and this can result in potential buckling.

FIG. 1 is an illustration from US Patent application Publication No. 2002/019349 illustrating the construction of a fusion pipe (an isopipe) for use in the overflow drawdown fusion process. As illustrated in FIG. 1, the system includes a supply pipe 9 which provides molten glass to a collection trough 11 formed in a refractory body 13 known as an "isopipe." Once steady state operation has been achieved, molten glass passes from the supply pipe to the trough and then overflows the top of the trough on both sides, thus forming two sheets of glass that flow downward and then inward along the outer surfaces of the fusion pipe. The two sheets meet at the bottom or root 15 of the pipe, where they fuse together into a single sheet of glass (un-numbered). The single sheet is then fed to drawing equipment (represented schematically by arrows 17), which controls the thickness of the sheet by the rate at which the sheet is drawn away from the root. The drawing equipment is located well downstream of the root so that the single sheet has cooled and become rigid before coming into contact with the equipment. As can be seen in FIG. 1, the outer surfaces of the final glass sheet do not contact any part of the outside surface of the fusion pipe during any part of the process. Rather, these surfaces only see the ambient atmosphere. The inner surfaces of the two half sheets which form the final sheet do contact the pipe, but those inner surfaces fuse together at the root of the pipe and are thus buried in the body of the final sheet. In this way, the superior properties of the outer surfaces of the final sheet are achieved.

As is evident from the foregoing, fusion pipe 13 is critical to the success of the fusion process. In particular, the dimensional stability of the fusion pipe is of great importance since changes in pipe geometry affect the overall success of the process. Unfortunately, the conditions under which the fusion pipe is used make it susceptible to dimensional changes. The fusion pipe must operate at elevated temperatures on the order of 1000° C. and above. Moreover, in the case of the overflow downdraw fusion process, the pipe must operate at these elevated temperatures while supporting its own weight as well as the weight of the molten glass overflowing its sides and in trough 11, and at least some tensional force that is transferred back to the pipe through the fused glass as it is being drawn. Depending on the width of the glass sheets that are to be produced, the pipe can have an unsupported length of 1.5 meters or more. Because of the high temperatures at which the process operates, the material of the pipe is susceptible to creep. Hence, the pipe sags steadily under gravity. Eventually the sag reaches a point where the quality and/or the dimensions of the finished glass are no longer within specifications and the pipe needs to be taken out of service and replaced. It is accordingly desirable to reduce the sag rate of the pipe, and thereby extend its useful life.

FIG. 2, also from US Patent application Publication No. 2002/019349, is a schematic drawing illustrating the use of off-center axial forces to control sag. In FIG. 2, pipe 13 is supported at its ends 23 by supports 21 and has a neutral axis 19. The neutral axis is that axis which does not elongate or contract as pipe 13 undergoes bending based on its mass distribution, its temperature distribution, and its material properties as a function of temperature. Put another way, the neutral axis is that axis which would not elongate or contract if pipe 13 were to undergo bending in the absence of axial forces F of FIG. 2 but with all other conditions the same. As shown in FIG. 2, in order to compensate for sag, axial forces F are applied horizontally to fusion pipe 13 at a distance H below neutral axis 19. Accordingly, the axial forces produce end moments of magnitude FH at the ends of the pipe. The sense of these moments is such that they reduce the tendency of the pipe to sag under the force of gravity. The moments produced by the axial forces will not eliminate all deformation of the pipe, but as illustrated by the comparative example presented below, a suitable choice of F and H will significantly prolong the useful life of the pipe. However, applying and maintaining the axial forces F is undesirable for reasons explained above Thus, due to the difficulties encountered when compressive forces are use to prevent sag; there is a need for a better, and preferably simpler, method of preventing isopipe sag.

SUMMARY

The invention is directed to a method of preventing isopipe sag when using the overflow drawdown fusion process for making flat glass sheets. The method of the invention applies a vertical restraint on at least one end of an isopipe resting on a support.

The invention is further directed to a method for reducing the sag or sag rate of an isopipe, illustrated in FIG. 4, having a longitudinal axis 100 (shown below the FIG. 4 structure), a middle region and first and second end regions 72 and 74, respectively; first end region 72 being the inlet end and second end region 74 being also called the compression side due to the weight on the isopipe and glass when present on the support 80. The isopipe is supported at its end regions by placement of the end regions on supports 80 and a vertical restraint is placed above the isopipe at least one of the end regions to oppose sag due to gravitational forces. FIG. 4 illustrates an embodiment using two vertical restraints represented as elements 92 and 94. In another embodiment as illustrated by FIG. 6, one or both of regions 72 and 74 of isopipe 70 can each, independently, be supported by a one or a plurality of clamps for applying a force [for example without limitation, a C-type clamp having a moveable element (not illustrated) for tightening], such clamps being represented in FIG. 6 as the crosshatched elements 192 and 194. Clamps 192 and 194 can have the support blocks 80 of FIG. 3 intergrated into the clamps so that the clamps both support and clamp; or isopipe 70 can be placed on supports 80 as illustrated in FIG. 3, and clamps 192 and 194 positioned about both the isopipe and the support blocks.

The invention is further directed to a method for reducing the sag or sag rate of an isopipe by an amount of at least forty percent (40%) relative to a method that does not include the use of at least one vertical restraint as described herein or compressive force applied to the sides of the isopipe.

DETAILED DESCRIPTION

Figure 1:
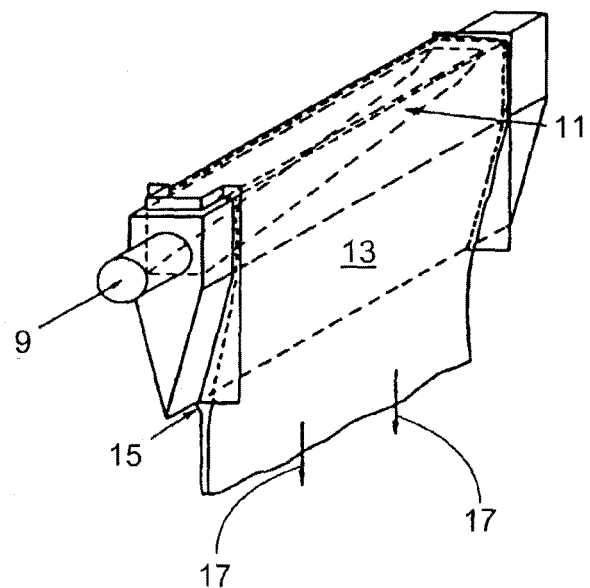
FIG. 1 is a schematic drawing from US Patent Application No. 2003/0192349 illustrating a representative construction for a fusion pipe (isopipe) for use in an overflow downdraw fusion process for making flat glass sheets.
Figure 2:
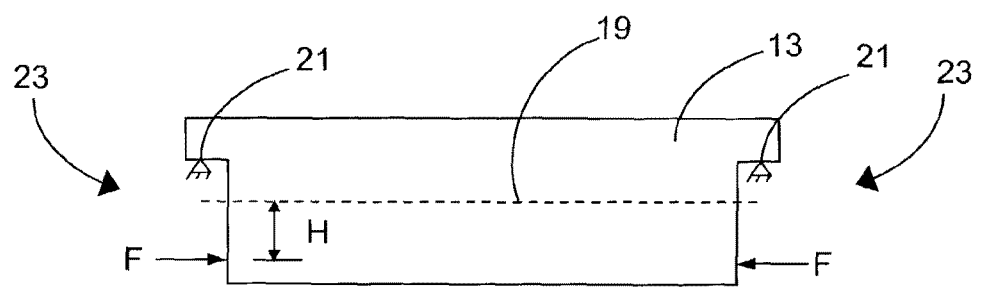
FIG. 2 is a schematic drawing from US Patent Application No. 2003/0192349 illustration the off-center coaxial forces used to control sag.
Figure 3:
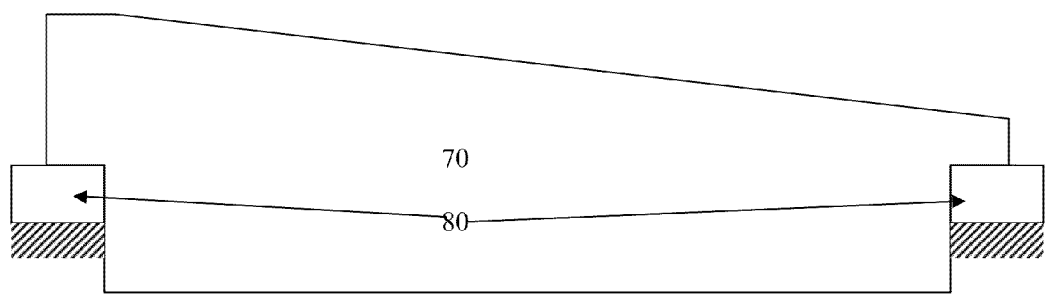
FIG. 3 is an illustration of a conventional isopipe and its boundary condition in which the isopipe sits on supports to prevent vertical translation of the ends of the isopipe.

The invention is directed to a simple, effective method of preventing isopipe sag. FIG. 3 is a schematic drawing illustrating isopipe 70 is shown resting on supports 80. The isopipe 70 has a longitudinal axis shown by double arrow 100 shown below FIG. 4. No axial forces F are applied isopipe 70 as is the case with isopipe 13 in FIG. 2.

Figure 4:
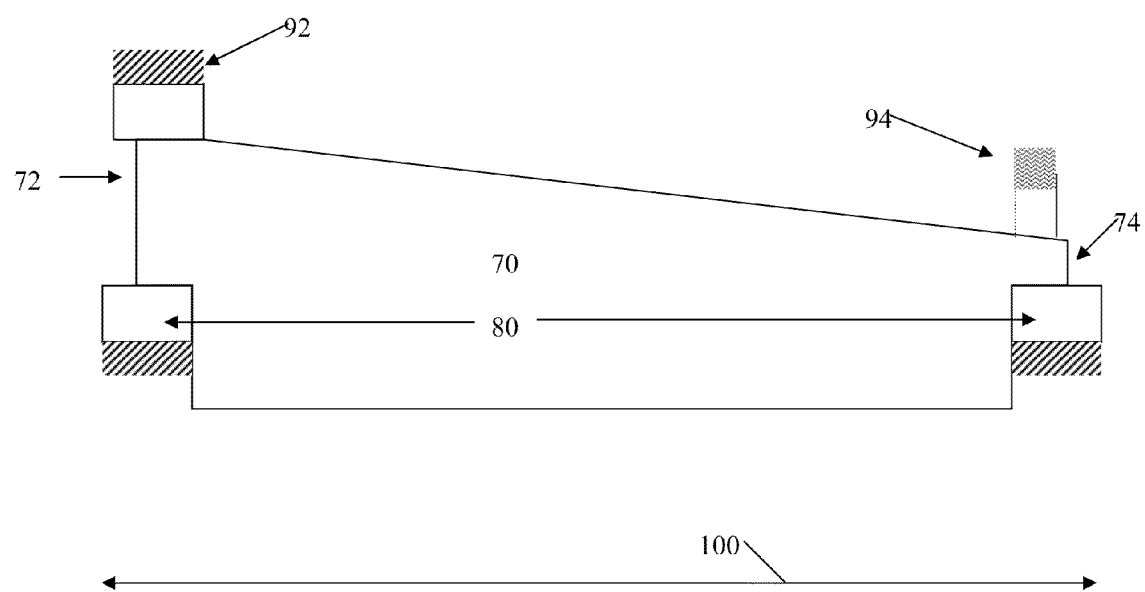
FIG. 4 is an illustration of the present invention in which, in addition to the supports as shown in FIG. 3, a vertical displacement restraint 92 is placed on the top surface of the inlet end of the isopipe to control sag; and, optionally, a further restraint 94 is placed on the compression end of the isopipe.

Using the approximation that an isopipe is a beam with an uniform cross section exposed to uniformly distributed load, then for a simply-supported case as illustrated in FIG. 3, the deflection profile can be described as a function of the distance from the inlet end, x such that:

$$u_1(x) = \frac{\omega_o}{EI}\left\{-\frac{1}{24}x^4 + \frac{L}{12}x^3 - \frac{L^3}{24}x\right\}$$

where $\omega_o$ (N/m) is a uniformly distributed load, E is Young's modulus, I is the second moment of inertia and L is the length of the isopipe. If an additional restraint 92 is added to one end of the isopipe such as inlet side 72 to prevent slope change in accordance with the invention, as is illustrated in FIG. 4, the deflection profile is changes to:

$$u_2(x) = \frac{\omega_o}{EI}\left\{-\frac{1}{24}x^4 + \frac{5L}{48}x^3 - \frac{L^2}{16}x^2\right\}$$

Figure 5:
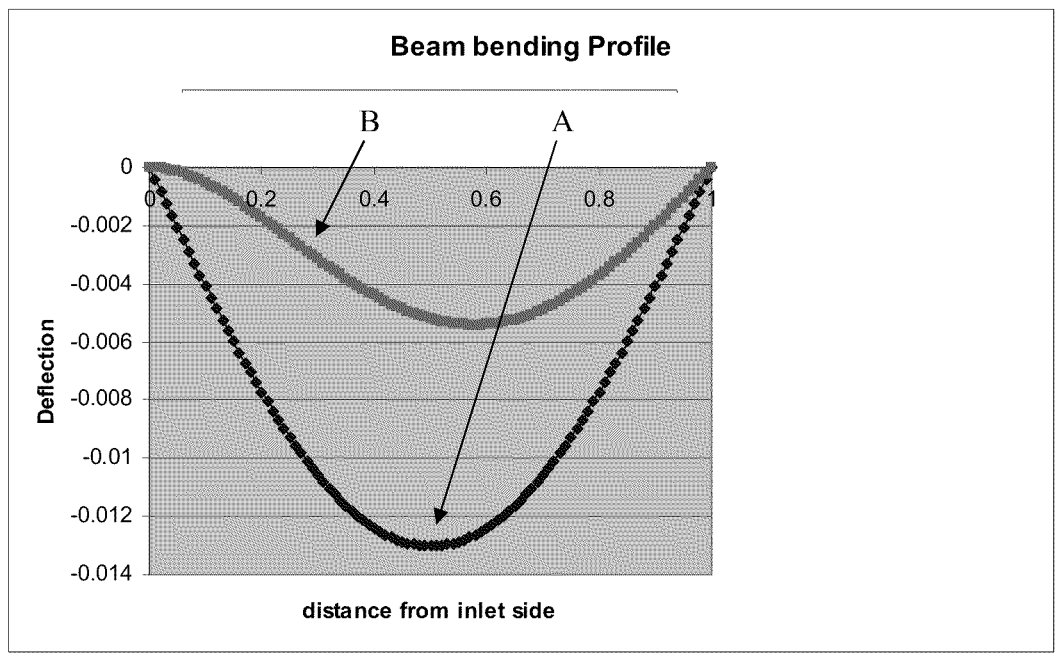
FIG. 5 is a graph illustrating sag as measured from the inlet end of an isopipe using only pier blocks or supports to control sag and an isopipe according to the invention which includes an additional vertical restraint.

FIG. 5 is a graph in is plotted $u_1$, $u_2$ where $0 \leq x \leq 1$ after setting all constants, $\omega_o$, E, I and L a unit number. Assuming that all other conditions are identical, the magnitude of the isopipe sag is shown to decrease from a value of approximately 0.013 for the simple beam case (curve A) to 0.0054 by the addition of restraint 92 to one of the ends of isopipe 72. As a result, in one embodiment of the invention using a single vertical restraint 92 on the isopipe inlet side 72, the sag has been reduced by approximately 59%. It is only 41.5% of the one with simply supported condition (curve B). In a second embodiment of the invention using a second vertical displacement restraint 94 on the end 74 opposite the inlet side 72 (typically called the compression side) can further reduce the sag since in this case both ends of the isopipe are restrained or clamped.

In a further embodiment of the invention, instead of using the fixed restraint, if we control the gap or force between the top surfaces of the inlet 72 and compression 74 sides of the isopipe and their vertical restraints appropriately, we can obtain a symmetric sag profile from the inlet end to the compression end regardless of its varying cross sections which generate the asymmetric profile of the sag. That is, generally the vertical restraint is a fixed constraint which does not allow any vertical movement of the surface with which it is in contact. However, if in this further embodiment the rigidity of the restraint is controlled, in addition to reducing the sag of the isopipe the sag profile from inlet end to compression end can also be controlled which results in further improvements in the attributes and quality of the resulting glass product. The restraint can thus be either a fixed rigid restraint or an adjustable restraint (for example without limitation, a C-type clamp) that permits adjustment of the force applied by the restraint to prevent movement in a vertical direction or allow a selected amount of movement in a vertical direction.

The invention is thus, in one aspect, directed to an isopipe for use in a fusion drawing process wherein said isopipe is a longitudinally-extending refractory element having an opening extending longitudinally there-through to facilitate the unobstructed flow of molten glass along opposite sides of said element, and said element is supported on its first and second end by a support under said ends, the improvement being in the addition of a vertical support member above and in contact with at least one of said first and second ends of said pipe to oppose sag due to gravitational forces; wherein said vertical restraint above and in contact with said pipe applies a force to said pipe to prevent vertical motion of said pipe and reduce sag and/or the rate of sag of said isopipe. The vertical restraint member can be a fixed, rigid vertical restraint member or an adjustable vertical restraint member.

Figure 6:
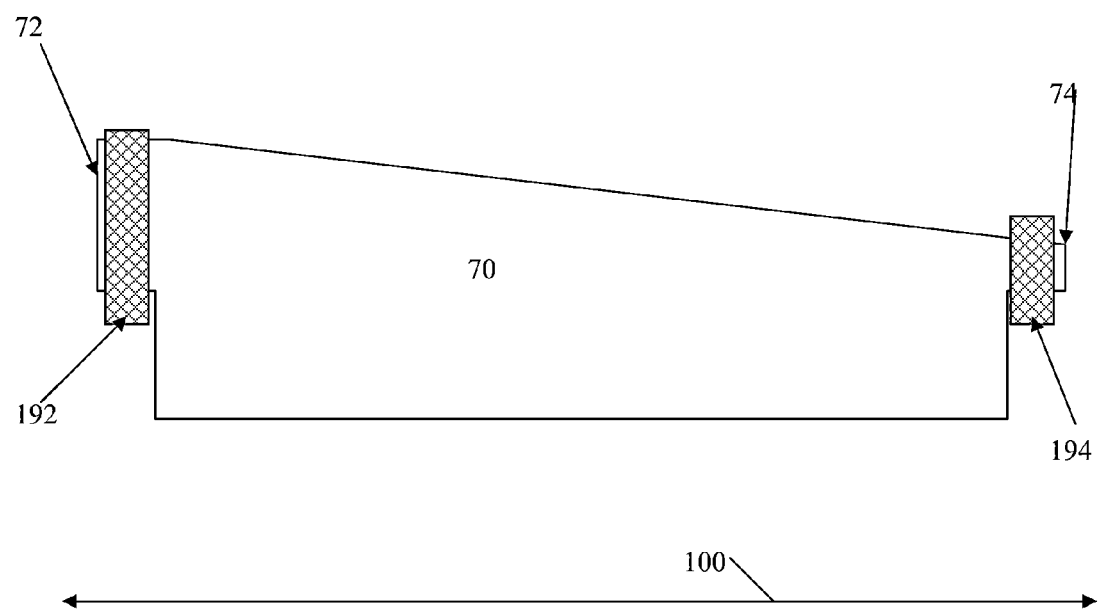
FIG. 6 is an illustration of the present invention in which, in addition to the supports as shown in FIG. 3, an adjustable clamp restraint 192 is placed at the inlet end of the isopipe to control sag; and, optionally, a further adjustable clamp restraint 194 on the compression end of the isopipe.

Thus, in an embodiment as illustrated by FIG. 6, one or both of regions 172 and 174 of isopipe 70 can each, independently, be supported by a one or a plurality of adjustable clamps for applying a force [for example without limitation, a C—type clamp having a moveable element (not illustrated) for tightening], such clamps being represented in FIG. 6 as the crosshatched elements 192 and 194. Clamps 192 and 194 can have the support blocks 80 of FIG. 3 integrated into the clamps so that the clamps both support and clamp; or isopipe 70 can be placed on supports 80 as illustrated in FIG. 3, and clamps 192 and 194 positioned about both the isopipe and the support blocks.

The invention is thus directed to a method for reducing the sag rate of an isopipe used in the fusion glass-making process, the method comprising having at least the steps of providing a pipe having a longitudinal axis, a middle region and a first and second end region; supporting the first and second end regions by placing said end regions on top of a support to thereby prevent the downward vertical motion of said end; and placing a vertical restraint above and in contact with at least one of said first and second ends of said pipe to oppose sag due to gravitational forces; wherein said vertical restraint above and in contact with said pipe applies a force to said pipe to prevent vertical motion of said pipe and reduce sag and/or the rate of sag of said isopipe. The vertical restraint member used in the method can be a fixed, rigid vertical restraint member or an adjustable vertical restraint member. The method of the invention reduces the sage and/or rate of sag by at least 40 percent relative to a method in which a vertical restraint member is not used on at least one end of the isopipe or compressive force applied to the sides of the isopipe.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

I claim:

1. A method for reducing the sag rate of an isopipe used in the fusion glass-making process, said method comprising:
   providing an isopipe for fusion drawing, the isopipe having a longitudinal axis, a middle region and a first and second end region,
   supporting the first and second end regions by placing said end regions on top of a support, and
   placing a vertical restraint above and in contact with at least one of said first and second ends of said isopipe to oppose sag due to gravitational forces;
   wherein said vertical restraint above and in contact with said at least one of said first and second ends of said isopipe applies a force to said pipe to prevent vertical motion of said isopipe and reduce sag of said isopipe.

2. The method according to claim 1, wherein said force-applying vertical restraint is a fixed, rigid restraint.

3. The method according to claim 1, wherein said force-applying vertical restraint is an adjustable restraint so as to control the force applied to the isopipe by the restraint.

4. The method according to claim 1, where in said vertical restraint is placed above and in contact with, and applies a downward force to, the first end of said isopipe.

5. The method according claim 1, wherein the vertical restraint is placed above and in contact with, and applies a downward force to, both the first end and the second end of said isopipe.

6. The method according to claim 1, wherein said method reduces the sag or sag rate of an isopipe at least 40% relative to a method that does not include use of said at least one vertical restraint or a compressive force applied along the sides of the isopipe.

* * * * *